(12) United States Patent
Morgan et al.

(10) Patent No.: US 9,947,032 B2
(45) Date of Patent: Apr. 17, 2018

(54) CUSTOMER INTERACTION MANAGER

(71) Applicant: NCR Corporation, Duluth, GA (US)

(72) Inventors: Taylor Drake Morgan, Atlanta, GA (US); Azhar Bande-ali, Decatur, GA (US); Brett S. Taylor, Alpharetta, GA (US); Curtis Patrick Quinn Evans, Atlanta, GA (US); James Lee Fortuna, Dallas, TX (US); David Allen Turner, Fort Worth, TX (US)

(73) Assignee: NCR Corporation, Atlanta, GA (US)

( * ) Notice: Subject to any disclaimer, the term of this patent is extended or adjusted under 35 U.S.C. 154(b) by 765 days.

(21) Appl. No.: 13/690,690

(22) Filed: Nov. 30, 2012

(65) Prior Publication Data

US 2014/0156430 A1    Jun. 5, 2014

(51) Int. Cl.
*G06G 1/12*     (2006.01)
*G06Q 30/06*   (2012.01)
*G06Q 20/20*   (2012.01)

(52) U.S. Cl.
CPC ......... *G06Q 30/0601* (2013.01); *G06Q 20/20* (2013.01); *G06Q 20/202* (2013.01)

(58) Field of Classification Search
None
See application file for complete search history.

(56) References Cited

U.S. PATENT DOCUMENTS

| | | | |
|---|---|---|---|
| 2004/0107165 A1* | 6/2004 | Blair et al. | 705/40 |
| 2004/0254868 A1* | 12/2004 | Kirkland et al. | 705/35 |
| 2010/0161433 A1* | 6/2010 | White | 705/17 |
| 2010/0274679 A1* | 10/2010 | Hammad | 705/21 |
| 2011/0055013 A1* | 3/2011 | Hammad | 705/14.53 |
| 2011/0225057 A1* | 9/2011 | Webb et al. | 705/16 |
| 2012/0059741 A1* | 3/2012 | Khan et al. | 705/27.1 |
| 2013/0073365 A1* | 3/2013 | McCarthy | 705/14.23 |
| 2014/0025515 A1* | 1/2014 | Argue et al. | 705/21 |
| 2014/0207682 A1* | 7/2014 | Wolfond et al. | 705/44 |
| 2015/0088673 A1* | 3/2015 | Higgins et al. | 705/16 |

* cited by examiner

*Primary Examiner* — Florian M Zeender
*Assistant Examiner* — Christopher R Buchanan
(74) *Attorney, Agent, or Firm* — Schwegman, Lundberg & Woessner

(57) ABSTRACT

An approach is provided for indirectly connecting a customer's mobile smart device to computers located at a business when the customer is making a purchase at the business. The customer's mobile smart device and the business's computers communicate over the Internet with a customer interaction manager executing on an Internet server. This provides an easy to use interface for the customer and allows the customer to receive information and send requests to the business without having to wait for personnel working at the business to be available.

13 Claims, 5 Drawing Sheets

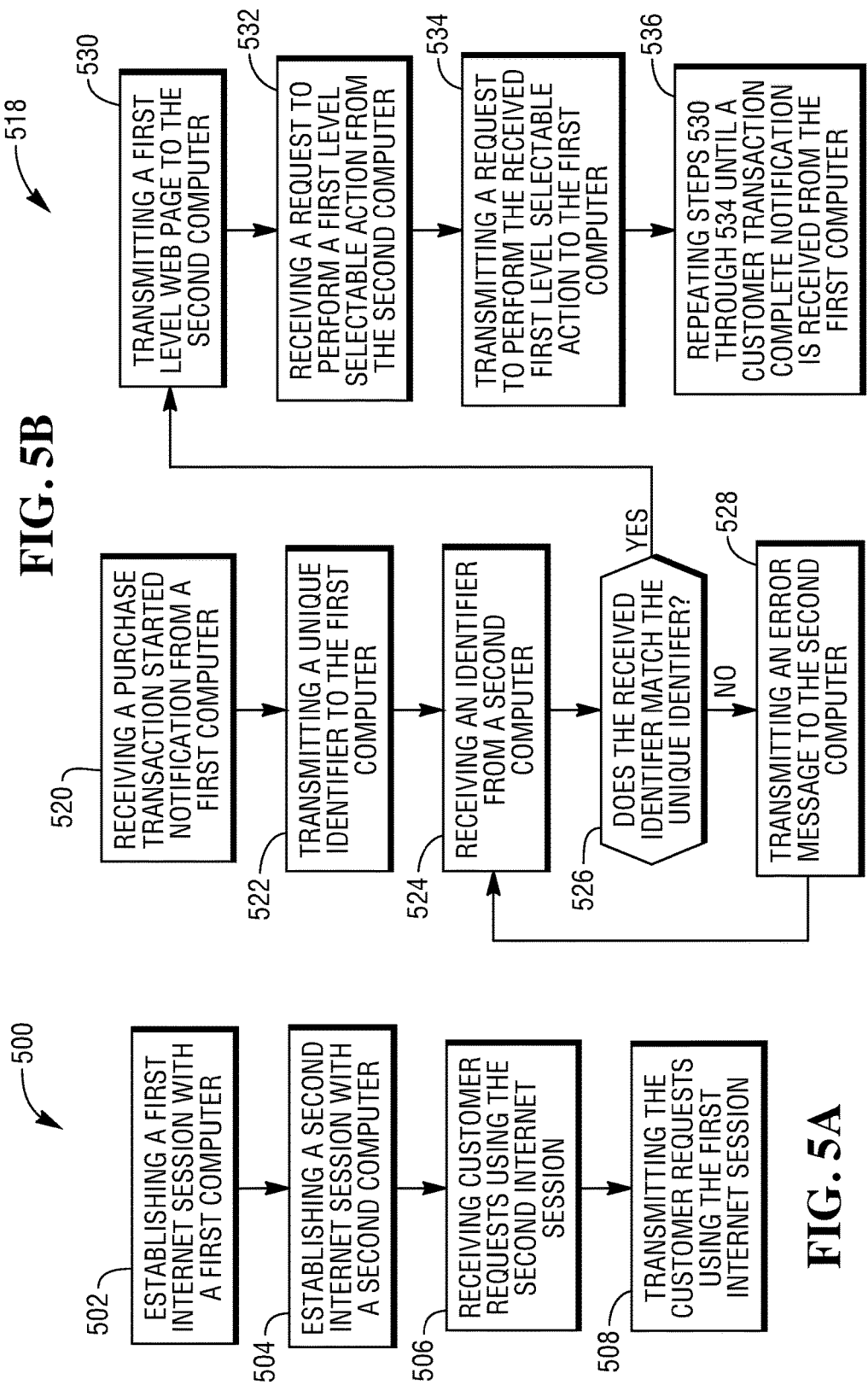

CUSTOMER INTERACTION MANAGER

FIELD OF THE INVENTION

The present invention relates generally to managing purchase transactions. More particularly, but not exclusively, it relates to providing an alternative channel to interact with a customer during a purchase transaction.

REFERENCE TO RELATED APPLICATIONS

Related implementations of the present inventions have been disclosed in three other copending U.S. patent applications that have the same assignee as the present patent application. The related copending U.S. patent applications are 1) U.S. patent application Ser. No. 13/690,896, filed Nov. 30, 2012 entitled "A CUSTOMER INTERACTION MANAGER ON A RESTAURANT COMPUTER"; 2) U.S. patent application Ser. No. 13/690,742, filed Nov. 30, 2012 entitled "A CUSTOMER INTERACTION MANAGER ON A MOBILE SMART DEVICE"; and 3) U.S. patent application Ser. No. 13/690,806, filed Nov. 30, 2012 entitled "A CUSTOMER INTERACTION MANAGER ON A POINT OF SALE COMPUTER". The three related copending U.S. patent applications are hereby incorporated by reference.

BACKGROUND

Any discussion of prior art throughout the specification should in no way be considered as an admission that such prior art is widely known or forms part of common general knowledge in the field.

Restaurants strive to provide a good customer experience so that customers will return and tell others of their good experience. Providing a good customer experience includes providing quality food but it also includes focusing resources on the customer during their visit. These resources include waitstaff that interacts with the customer during their visit to monitor and fulfill the customer's needs.

When customer traffic increases, such as during peak dining periods, the waitstaff can become overloaded and the customer experience is less enjoyable because the waitstaff fails to identify and fulfill all of the customer's needs. This failure may cause the waitstaff and the customers to become frustrated further diminishing the customer experience. In addition to diminishing the customer experience, the waitstaff misses opportunities to up-sell the customer or sell additional beverages or menu items causing the restaurant to miss out on additional revenue.

A similar problem can exist in other types of businesses where a customer typically waits while a service is being performed or a product is being prepared. During the wait time the customer have little or no contact with employees of the business since they are usually helping customers that just arrived or are making a payment before leaving. If the customer wants information or a progress update, they must usually wait in a line with newly arrived customers or try to find an employee that is not busy. Examples of these kinds of businesses include tire stores, auto repair centers, oil change centers, computer repair stores, restaurants with food take-out area where a customer orders food and waits for it to be prepared to take home and hospital emergency centers where non-critical patients check in and wait, sometimes for hours, before seeing a doctor.

SUMMARY OF THE INVENTION

Among its several aspects, the present invention seeks to overcome or ameliorate at least one of the disadvantages of the prior art, or to provide a useful alternative.

Among its several aspects, the present invention recognizes there is an advantage for a business to create an alternative channel to interact with a customer where the customer present at the business can initiate an interaction with the business instead of having to wait for an employee of the business to interact with the customer.

Among its several aspects, one embodiment of the present invention is directed to methods and systems for connecting customer mobile smart devices to an Internet server computer that accepts requests from the customer located at a business and processes the requests sending some of them to a point of sale server computer at the business that causes the requests to be performed. The requests may be carried out by the POS server computer or the POS server computer may send requests to personnel working at the business requesting them to perform a function for the customer.

Among its several aspects, one embodiment of the present invention discloses a customer interaction manager that acts as an intermediary between a customer's mobile smart device and the computers used to operate a business. The customer interaction manager provides a common interface that can be used to communicate with different businesses without having to have specific applications or knowledge of each business. A single downloadable application or a web browser can be used by the mobile smart device to communicate with the customer interaction manager over the Internet. The customer interaction manager can then communicate with the computers used by the business where the customer is located.

For example, a customer may enter a restaurant and be seated at a table. A purchase transaction is started for the customer with a point of sale terminal at the business. The POS terminal communicates information identifying the purchase transaction to a customer interaction manager and receives a unique ID for the transaction. The unique ID is given to the customer with a uniform resource location (URL) for a web site serviced by the customer interaction manager. The customer, using a web browser on a mobile smart device such as a smart phone, displays a web page at the URL address and enters the unique ID. The customer is authenticated and now has access to information about the purchase transaction and can receive information such as specials of the day and discount items plus the customer can make requests to the restaurant such as ordering additional items or services. The customer interaction manager also stores details of the customer's purchase and can provide offers based on prior purchases made at this and other restaurants that use the system.

In accordance with an embodiment of the present invention, there is provided a computer implemented method used by a customer interaction manager to facilitate an additional method for a customer to interact with the business to receive faster service and additional options. To this end, a method of managing customer interaction with a business implemented by a server computer communicating over the Internet with a first computer and second computer is provided. The method comprising: establishing a first Internet session with the first computer located at the business after a purchase transaction started notification is received from the first computer and a unique identifier identifying the purchase transaction is generated and transmitted to the first computer; establishing a second Internet session with the second computer located at the business and operated by a customer making the purchase transaction after determining an identifier received from the second computer matches the unique identifier; receiving customer requests using the second Internet session from the second computer; and transmitting the received customer requests using the first Internet session to the first computer.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawings, figures and charts.

FIG. 5 is a high-level flow chart illustrating an exemplary method of operating the customer interaction manager system on an Internet server.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
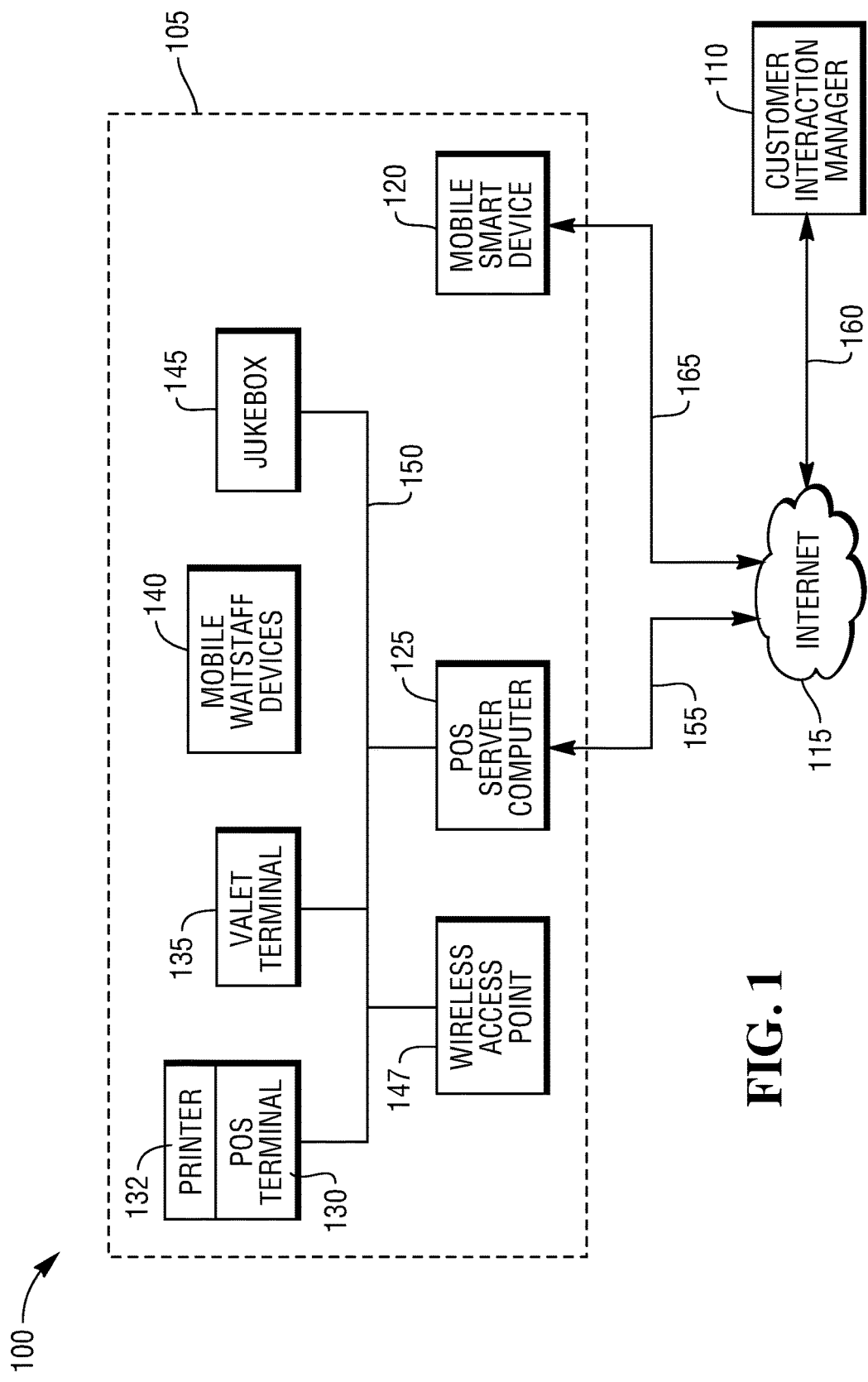
FIG. 1 is a high-level block diagram illustrating an exemplary embodiment of a Customer Interaction Manager (CIM) system.

Referring now to FIG. 1, there is provided a high-level block diagram illustrating an exemplary embodiment of a customer interaction manager (CIM) system 100. The CIM system 100 includes a restaurant system 105 and a customer interaction manager (CIM) 110. The CIM 110 communicates, using a communications network including the Internet 115, to computers and smart devices in the CIM system 100. This embodiment of the CIM system 100 depicts a single restaurant system 105 however, it should be understood that the CIM system 100 is designed to include thousands of restaurants similar to the depicted restaurant system 105. The additional restaurants may suitably include independent restaurants and chain restaurants where each chain may include thousands of the restaurants that are part of the CIM system 100.

The restaurant system 105 includes a number of computer devices that are owned or operated by the restaurant system 105. These devices may suitably include a point of sale (POS) terminal 130, a valet terminal 135, a plurality of mobile waitstaff devices (MSD) 140, a jukebox 145, a wireless access point 147 and a point of sale (POS) server computer 125 in communication with each of the other devices over a local area network 150. The local area network 150 is a wired Ethernet network (IEEE 802.3). The POS server computer 125 is connected to the wired network 150 but one or more of the other devices may be wirelessly connected to the network 150 using the wireless access point 147. The wireless access point 147 supports one or more of the IEEE 802.11 a/b/g/n standards. The POS server computer 125 communicates with the Internet 115 over an external network 155. This network 155 may include different types of physical networks.

The POS terminal 130 includes a printer 132 that is used to print receipts and other documents. In some embodiments, multiple POS terminals 130 are present and they function in a similar manner to the depicted POS terminal 130.

The plurality of mobile waitstaff devices 140 are used to communicate information between the waitstaff and the POS server computer 125. Each of the mobile waitstaff devices 140 includes a wireless transceiver for communicating with the wireless access point 147. Each of the waitstaff may carry one of the plurality of mobile waitstaff devices 140. The POS computer server 125 communicates wirelessly to the plurality of mobile waitstaff devices 140 using the wireless access point 147. In some embodiments, one or more of the waitstaff uses a personal smart device, such as a smart cellular phone, to perform the same functions as one of the plurality of mobile waitstaff device 140. The waitstaff functions are performed on the personal smart device by an application that must be downloaded and executed by the personal smart device.

In some embodiments, there is one or more fixed waitstaff terminals and the POS server computer 125 communicates with some or all of the waitstaff through these fixed waitstaff terminals. For example, the bar area of a restaurant may use a fixed waitstaff terminal to communicate with personnel working the bar, but mobile waitstaff devices 140 are used by waitstaff assigned to handle tables. The term fixed means that the terminal is placed and used in a fixed location. They may be cabled to a power source or the network 150.

The valet terminal 135 is used to communicate with parking attendants that perform a valet parking service for customers of the restaurant system 105. It should be noted that not all restaurants provide a valet parking service so not all restaurants will have a valet terminal 135. In some embodiments, the valet terminal 135 is wirelessly connected to the network 150 using the wireless access point 147.

The jukebox 145 is a device that plays music or other recorded sounds. It can be operated from a control panel on the jukebox 145 or remotely controlled by the POS computer server 125. The jukebox 145 may be physically connected to the network 150 or wirelessly connected to the network 150 using the wireless access point 147.

The restaurant system 105 includes at least one mobile smart device (MSD) 120 that is used by a customer. The MSD 120 is owned by a customer patronizing the restaurant system 105. To simplify the description, the present embodiment depicts a single MSD 120 but it should be appreciated that the CIM system 100 is designed to function with a restaurant system 105 where multiple customers employ their MSDs 120 and preferably the system 100 employs one MSD 120 per table or customer. The MSD 120 includes a web browser and connects to the Internet 115 to access web pages from web servers connected to the Internet 115. Examples of an MSD 120 include a smart cellular phone, a tablet computer or any portable computer with access to the Internet 115. The MSD 120 uses a wireless network 165 to connect to the Internet 115. The wireless network 165 may suitably include a cellular network, a WIFI network or a near field network such as Bluetooth. The WIFI networks may suitable include IEEE 802.11 a/b/g/n wireless networks. In some embodiments, the restaurant system 105 includes a fixed computing device at each table that performs the functions of the MSD 120.

In some embodiments, a network based on near field communications is provided to the tables in the restaurant system 105. The near field communications include support for Bluetooth communication with MSDs 120 located at a table. The POS server computer 125 can use the near field network to communicate with the MSDs 120.

Figure 2:
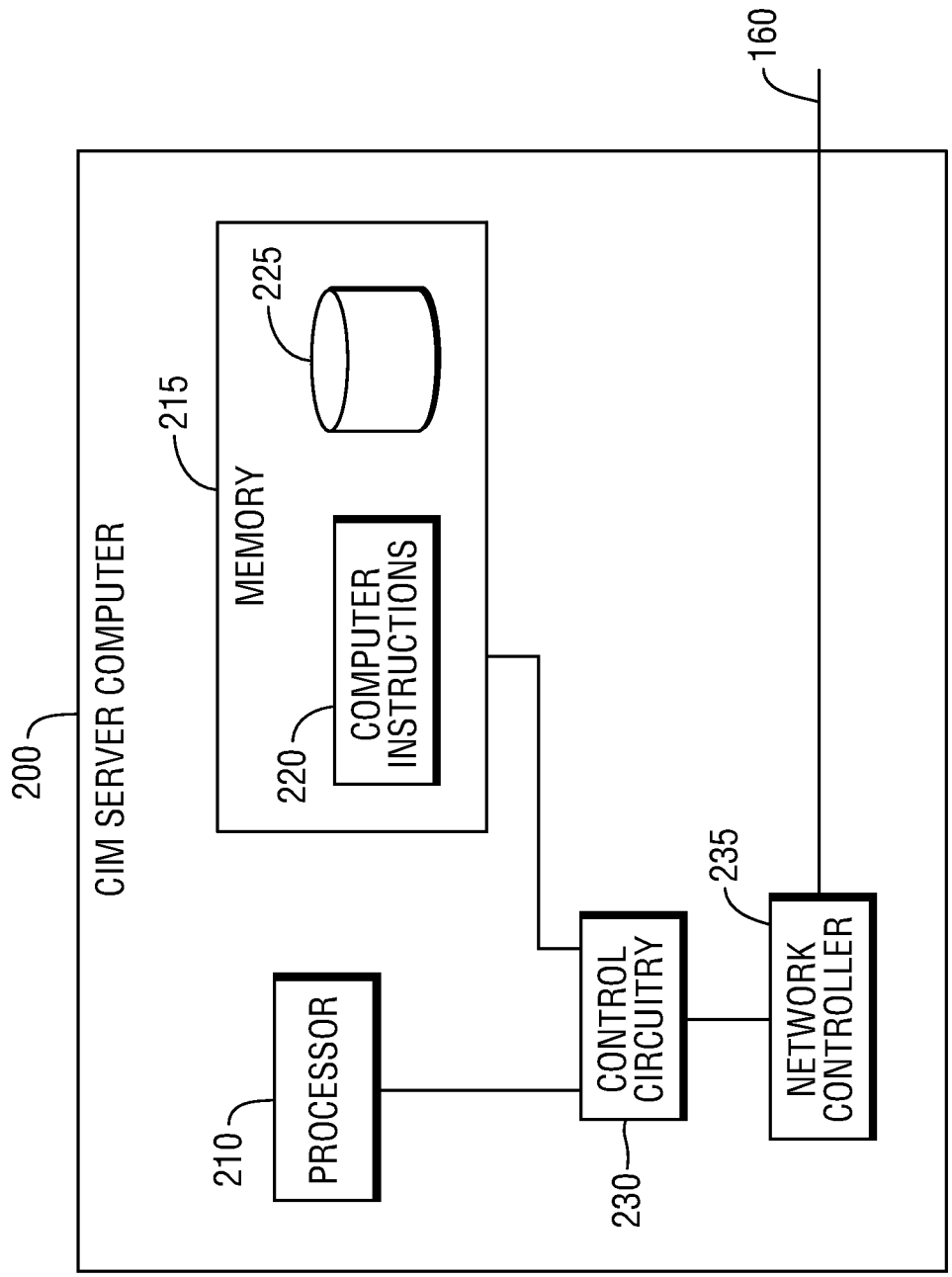
FIG. 2 is a high-level block diagram illustrating selected hardware components of a CIM server computer.

Turning now to FIG. 2, there is provided a high-level block diagram illustrating selected hardware components of a CIM server computer 200 that executes the Customer Interaction Manager (CIM) 110. The CIM server computer 200 is depicted as a single server computer but it should be appreciated that the CIM 110 can be scaled up and implemented across multiple copies of the server computer 200 allowing the CIM 110 to provide its service to a large number of restaurants system 105 and mobile smart devices 120. In some embodiments, the CIM 110 is implemented on multiple server computers where the server computers are located in different computer data centers and the computer data centers can be located in different geographical locations around the world. In some embodiments, the server computer 200 is a virtual computer, such as the virtual computer product offered by Amazon's Elastic Compute Cloud™. Using such a virtual computer product allows for dynamic scaling of the CIM 110 to meet peek demand at any geographical location around the world.

The CIM server computer 200 includes at least one processor 210, a memory 215, control circuitry 230 and a network controller 235. The control circuitry 230 allows the processor 210 to communicate with and control the memory 215 and the network controller 235. While a single processor 210 is depicted, multiple processors and processors with multiple processor cores are envisioned and within the scope of this invention.

The memory 215 uses non-transitory data and program storage devices including both volatile and non-volatile memory. The non-volatile memory may suitably include flash memory, other types of solid state electronic memory and rotating storage devices. Computer instructions 220 stored in the memory 215 are executed by the processor 210 and cause the processor 210 to control the devices attached to the server computer 200 and to provide the services and functions performed by the software elements of the CIM 110. The computer instructions 220 comprise software that includes an operating system, server applications, a database application and the software that comprises the CIM 110. The server applications include an Internet web server and an email server that supports at least simple mail transport protocol (SMTP) to send and receive email. Data for a database 225 is also stored in the memory 215.

The network controller 235 includes hardware and software required to communicate with the high speed network 160 which ultimately connects to the Internet 115. The connection to the Internet 115 allows the CIM server computer 200 to communicate with other computers and smart devices and service requests made to the server computer 200. The CIM server computer 200 is a web based server and the CIM 110 is a web based function. The CIM computer server 200 connects to the Internet 115 over a network 160. The network 160 may include multiple types of physical networks. The CIM computer server 200 physically connects to a wired Ethernet (IEEE 802.3) network and then logically connects to one or more wide area networks that connect to the Internet 115. In some embodiments, the CIM computer server 200 connects to an optical or other high speed network that allows communications with the Internet 115.

Figure 3:
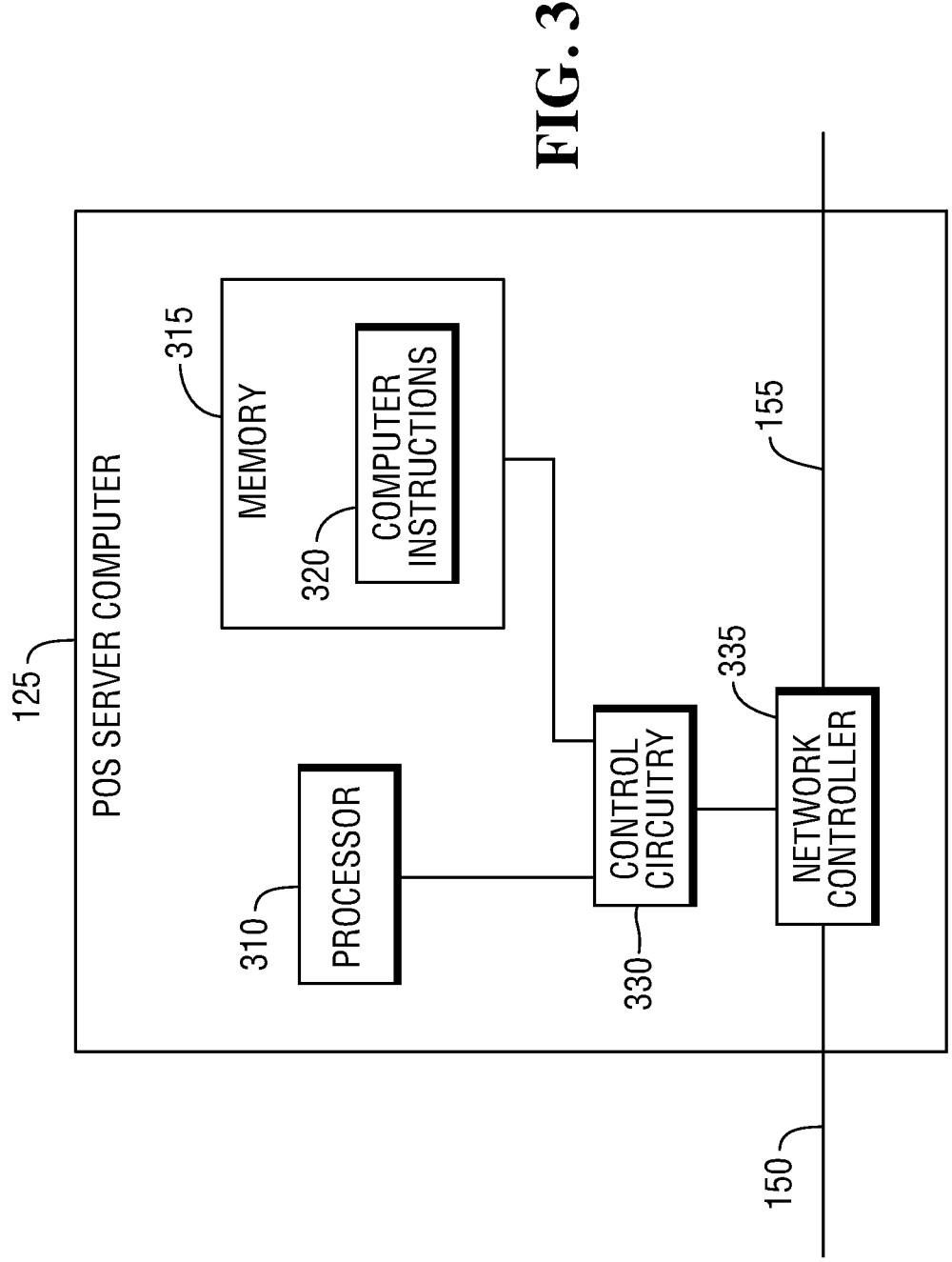
FIG. 3 is a high-level block diagram illustrating selected hardware components of a POS server computer.

Turning now to FIG. 3, there is provided a high-level block diagram illustrating selected hardware components of a POS server computer 125. The POS server computer 125 includes at least one processor 310, a memory 315, control circuitry 330 and a network controller 335. The control circuitry 330 allows the processor 310 to communicate with and control the memory 315, the network controller 335 and any other components of the POS server computer 125. While a single processor 310 is depicted, multiple processors and processors with multiple processor cores are envisioned and within the scope of this invention.

The memory 315 uses non-transitory data and program storage devices including both volatile and non-volatile memory. The memory may suitably include flash memory (e.g., NOR, NAND), SRAM, DDR SDRAM, other types of solid state electronic memory and rotating storage devices. Computer instructions 320 stored in the memory 315 are executed by the processor 310 and cause the processor 310 to control the components of and devices attached to the POS server computer 125 and to provide the services and functions performed by the POS server computer 125. The computer instructions 320 comprise software that includes an operating system, server applications and POS functions including software that allows purchase transactions for customers at restaurant system 105.

The network controller 335 includes hardware and software required to communicate with the high speed network 155 which connects to the Internet 115. The connection to the Internet 115 allows the POS server computer 125 to communicate with other computers connected to the Internet 115. The network controller 335 further includes hardware and software required to communicate with the local area network 150 that is used within the restaurant system 105 to communicate with other computers or devices. The other computers and devices may suitably include, but are not limited to, the POS terminal 130, the valet terminal 135, the mobile waitstaff device 140, the wireless access point 147 and the jukebox 145. The POS server computer 125 communicates with the mobile waitstaff devices 140 using the local area network 150 and the wireless access point 147.

Figure 4:
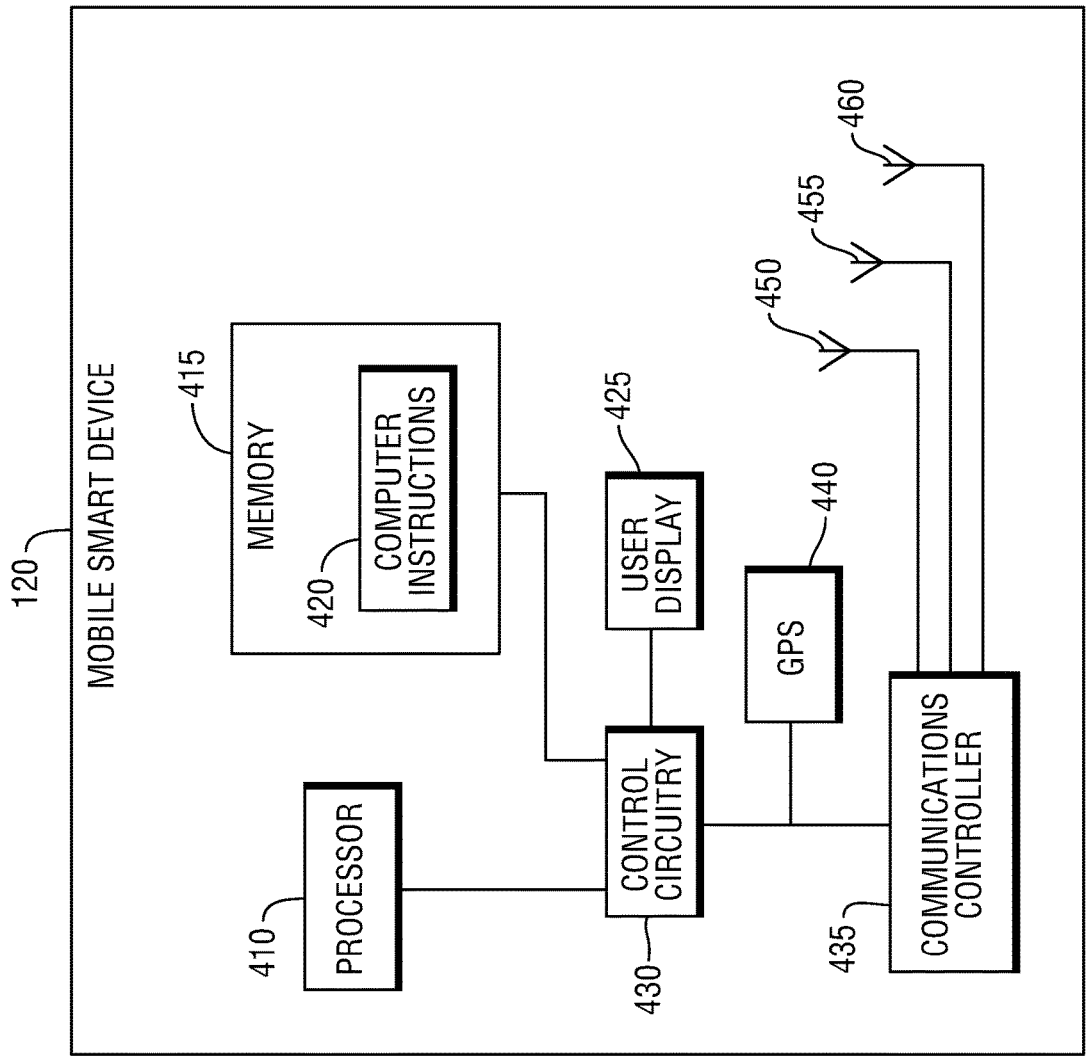
FIG. 4 is a high-level flow chart illustrating selected hardware components of a mobile smart device used by a customer.

Turning now to FIG. 4, there is provided a high-level block diagram illustrating selected hardware components of the mobile smart device 120 used by a customer. The mobile smart device 120 includes at least one processor 410, a memory 415, control circuitry 430, a communications controller 435, a touch screen user display 425 and a global positioning system (GPS) device 440. The control circuitry 430 allows the processor 410 to communicate with and control the memory 415, the touch screen user display 425, GPS device 440 and the communications controller 435. While a single processor 410 is depicted, multiple processors and processors with multiple processor cores are envisioned and within the scope of this invention. In addition, two or more functions may be combined into a single device.

The memory 415 uses non-transitory data and program storage devices including both volatile and non-volatile memory. The memory may suitably include flash memory (e.g., NOR, NAND), SRAM, DDR SDRAM, other types of solid state electronic memory and rotating storage devices. Computer instructions 420 stored in the memory 415 are executed by the processor 410 and cause the processor 410 to control the component and devices of the mobile smart device 120 and to provide the features and functions performed by the mobile smart device 120. The computer instructions 420 comprise software that includes an operating system, software that controls component and device functions, built-in applications and downloadable applications.

The communication controller 435 includes hardware and software required to communicate with multiple types of wireless networks. The communication controller 435 communicates with the wireless cellular network 165 using a first antenna 450. Communicating over the wireless cellular network 165 allows the mobile smart device 120 to communicate with the Internet 115. The connection to the Internet 115 allows the mobile smart device 120 to communicate with other computers connected to the Internet 115.

The communication controller 435 further includes hardware and software required to communicate with a WIFI wireless local area network using a second antenna 455. The WIFI networks include wireless networks bases on IEEE 802.11 a/b/g/n standards.

The communication controller 435 further includes hardware and software required to communicate with a near field wireless network using a third antenna 460. The near field network includes a Bluetooth based network.

The GPS device 440 determines the location of the MDS 120 by receiving signals from satellites that are part of an orbiting constellation of GPS satellites (not shown). Location data from the GPS 440 can be accessed and used by applications executing on the MSD 120.

The touch sensitive user display 425 is used to send and receive information from a customer using the mobile smart device 120. Information can be displayed on the touch sensitive user display 425 and the touch sensitive user display 425 can determine the location on the display 425 of one or more touches made by the customer. This information is used by software executing on the MSD 120 to control the features and functions of the MSD 120.

Turning to FIGS. 5A and 5B, there are provided high-level flow charts illustrating exemplary methods of operating the customer interaction manager system 100. These exemplary methods describe the interaction of the customer interaction manager 110 executing on the CIM server computer 200 with the POS server computer 125 and the MSD 120.

In these examples, a customer wishes to dine at a restaurant employing the restaurant system 105. The restaurant is located within a structure that may include both enclosed areas and areas open to the elements. The structure may include buildings and floating structures such as boats, barges and the like.

The customer enters the restaurant, is greeted by restaurant waitstaff and requests to be seated. The waitstaff assigns the customer to a table and the customer is escorted to and seated at the assigned table. The waitstaff, using the POS terminal 130, starts a purchase transaction for the assigned table and the customer. At this time, the identity of the customer may not be known so at least initially, the purchase transaction is only associated with an ID for the assigned table and the purchase transaction. Each table at the restaurant is assigned a unique ID and the IDs are known to the waitstaff. Starting the purchase transaction includes making a "start purchase transaction request" to the POS server computer 125, using the POS terminal 130.

The POS server computer 125 creates a record for the purchase transaction. The record is stored in a database. The record may be a single record with a large number of fields stored in a table in the database or the record may include fields that point or link to other records in the same table or other tables in the database. The record initially only includes the assigned table ID where the customer is seated but will be updated to include details for all items ordered by the customer. The items include all food, drinks, merchandise and other services or products provided to the customer. The record will also include a running total for the items and when payment is made, the amount and type of payment. The record also includes the time, date and length of the purchase transaction.

At some point during the purchase transaction, the customer may be identified and this information is also stored in the record. The item and payment information can be entered from any of the terminals or devices used by the waitstaff of the restaurant 105. Payment application software can also provide customer identification information when used to process the customer's payment.

When the POS server computer 125 creates the record for the purchase transaction, it also creates a "purchase transaction started notification". This notification includes the assigned table ID and a restaurant ID. The POS server computer 125 then transmits the notification to the customer interaction manager 110 executing on the CIM server computer 200, using the Internet 115. The CIM 110 generates a unique identifier (ID) for the purchase transaction at this restaurant and transmits it back to the POS server computer 125 over the Internet 115. The POS server computer stores the unique ID with the purchase transaction data.

The purchase transaction is ended when payment is made by the customer. When the purchase transaction ends, the POS server computer 125 creates a "purchase transaction complete notification" and sends it to the customer interaction manager 110 executing on the CIM server computer 200, using the Internet 115. This notification includes the unique identification and causes the customer interaction manager 110 to terminate the purchase transaction and to close communications with the MSD 140 (second computer).

In the following examples, the first computer is the POS server computer 125 and the second computer is the MSD 140. Both are located within the restaurant during the purchase transaction. The MSD 140 belongs to the customer and will leave the restaurant when the customer leaves. The server computer is the CIM server computer 200 executing the customer interaction manager 110. The functions described as performed by the server computer 200 are performed as a result of the processor 210 executing the instructions 220 stored in the memory 215 including instructions comprising the customer interaction manager 110.

Referring now to FIG. 5A. At step 502, the server computer establishes a first Internet session with the first computer. An Internet session is a logical connection that allows software executing on the server computer to communicate with software executing on the first computer. An Internet session uses the Internet 115 for at least a portion of the communications path. The first Internet session is created in response to receiving a purchase transaction started notification from the first computer over the Internet 115. The notification includes information that identifies the restaurant. The server computer further generates a unique identifier for the purchase transaction and transmits the unique identifier to the first computer. The unique identifier may suitably include a globally unique ID or similar type of ID that will uniquely identify this purchase transaction from all others.

After the first computer receives the unique ID for the purchase transaction, a copy of the unique ID is given to the customer. In some embodiments, the first computer prints the unique ID on receipt paper and waitstaff delivers the paper to the customer. In other embodiments, the first computer delivers the unique ID wirelessly to the second computer which is operated by the customer. For this approach, the customer must establish wireless communications between the second computer and the first computer and identify the second computer as being associated with the table ID. This can be accomplished by having a table ID or some other identifier associated with the table displayed at the table. The customer, using a downloaded application on the second computer, enters the table ID to establish communications between the second computer and the first computer and then receives the unique ID for the purchase transaction from the first computer.

In addition to the unique ID, a uniform resource locator (URL) for a web site is also printed or delivered to the second computer. The URL is for a web site serviced by the server computer. The web site is used to communicate information between the second computer and the server computer. The second computer using either a web browser or a downloaded application accesses a web page addressed by the URL. This web page has information and instructions for the customer to follow including entering the unique ID into a location on the web page which causes the unique ID to be transmitted to the server computer.

At step 504, the server computer establishes a second Internet session with the second computer. Both the first and second computers are located within a business during a period of time where the customer is performing the purchase transaction. The second Internet session is established after the server computer 200 receives an identifier from the second computer, using the Internet 115. If the received identifier matches the unique identifier generated in step 502, then the server computer 200 establishes the second Internet session with the second computer. The second computer sends the identifier by accessing a web page addressed by the URL and entering the unique identifier. In some embodiments, the second Internet session includes using the web interface to communicate with the customer. In other embodiments, a separate communications channel is established with a downloaded application executing on the second computer. The application provides a user interface for the customer to send and receive information from the server computer.

At step 506, the server computer receives customer requests using the second Internet session. The customer requests include requesting that waitstaff come to the table, ordering more of an item, ordering a new item, requesting a check, requesting that waitstaff pickup a payment, requesting parking valet bring the customer's car, requesting that the jukebox play a certain item, requesting a service or requesting another product or service offered by the restaurant.

At step 508, the server computer transmits the received customer request to the first computer using the first internet session. The first computer then processes the customer request.

Customer selectable actions are divided into different levels. Access to each level requires the customer to provide customer identifiable information before the customer can use actions a certain level. The levels are arranged from lowest to highest where the lowest level (first level) requires the customer to provide the least amount of information and the highest level requires the customer to provide the highest level of information.

In some embodiments, actions in the lowest level can be accessed if the customer provides a valid unique identifier. The next level can be accessed if the customer provides a valid email address. The highest level requires the customer to enter a username and password that has previously been established. The username and password may be associated with a social media site and can be used by the server computer to access the customer's account on the social media site.

Actions at the highest level include functions that allow the customer to request that messages be posted or sent using the social media site where the messages express a positive experience the customer is having at the restaurant. Additionally, at the highest level, the actions include the ability to identify favorite items the customer has tried. The information is stored by the server computer 200 and available to the customer on future visits once they are authenticated by entering their username and password. The information may also be transmitted to the POS server computer 125. In some embodiments, the server computer stores all the information received about the purchase transaction and the customer. This includes all the items purchased by the customer, customer related information, customer preferences, services used by the customer, customer loyalty program information, and what other restaurants the customer may have visited. In some embodiments, this information is used to make discount offers to the customer and to suggest additional items the customer might want to purchase. In some embodiments, each restaurant provides information on specials or discounted items and this information is used along with the stored customer information to make discount offers and suggestions to the customer.

In some embodiments, the customer may have to wait for a table to become available before they can be seated. In this case, the waitstaff, using the POS terminal 130, starts a purchase transaction for the customer. The POS terminal 130 prints out a paper that includes a URL to a web site serviced by the server computer 200 with a unique ID that was generated by the server computer 200 after the POS terminal 130 started the purchase transaction for the customer. The process is the same as described above for starting a purchase transaction.

The customer then proceeds to a waiting area and accesses the web site using the URL and enters the unique ID provided. The POS server computer 125 has communicated to the server computer 200 that the customer is waiting to be seated so the server computer 200 provides a different set of selectable actions from those provided when the customer is seated at table for dining. These actions allow the customer to receive an estimated wait time for seating or a notice that they can now be seated. This information is provided by the server computer 200 which receives updates from the POS server computer 125 about the customer.

The customer may also requests drinks from a bar in the restaurant or complete customer satisfaction surveys or review information about specials of the day or other promotional information. When the customer is seated at a table, the table ID for that table is associated with the purchase transaction and the server computer 200 is notified that the customer has been seated. The server computer 200 then changes the selectable actions the customer can select from to those actions defined for a customer seated at a table.

Referring now to FIG. 5B. At step 520, the server computer 200 receives a purchase transaction started notification from the first computer (POS server computer 125). This notification marks the beginning of a purchase transaction for a customer at the restaurant 105. At this point, only an assigned table identification is available for the customer. The notification is received using the Internet 115 for at least a portion of the communications path.

At step 522, the server computer 200 transmits a unique identifier that uniquely identifies the purchased transaction to the first computer, using the Internet 115. The server computer 200 also generates the unique identifier based on information in the purchase transaction started notification received in step 520.

At step 524, the server computer 200 receives an identifier from the second computer, located at the business where the first computer is located. The identifier is received over the Internet 115.

At step 526, the server computer 200 determines if the received identifier matches the unique identifier that uniquely identifies the purchase transaction. If there is a match, control transfers to step 530. If there is no match, control transfers to step 528.

At step 528, the server computer 200 transmits an error message to the second computer. The error message is transmitted in the form of a web page that is displayed on the second computer. The web page allows the customer to reenter the identifier.

At step 530, the server computer 200 transmits a first level web page to the second computer. At this step, the customer has been authenticated at the lowest or first level. The first level web page displays functions or actions that the customer can select. Some of the actions can be performed while the customer is only identified at the first level. However, other actions will require the customer to enter additional information and be authenticated at a higher level, for example a second level or third level. Each additional level requires additional customer information than can include the customer's email address and username and password for a social media site. Each higher level allows the customer to perform additional functions or actions.

The first level allows the customer to see the current bill which includes the items that have been ordered. Most other actions require the customer to move to the second level by providing an email address. At the second level, the customer can request additional items, receive suggestions for items to purchase, add suggested items, request a physical bill or check be brought to the table or request that payment be picked up from the table. The customer enters the third level by providing a username and password for an account that was previously created by the customer. At the third level, the customer can request that comments about the restaurant or items be shared via social media. The customer can provide feedback to the restaurant, save item favorites, review past favorites, view prior purchases or order history, view a user dashboard, provide payment and split the check. The customer can split the check with another customer at the table. The customer can designate the items to be split and request that new checks be delivered to the table. At the third level, the customer can also store payment information that can be used to pay for the purchase transaction.

At step 532, the server computer 200 receives a request over the Internet to perform a first level selectable action from the second computer. The first level selectable action is listed on the first level web page transmitted to the second computer in step 530. The customer selected the action causing the second computer to send the request.

At step 534, the server computer 200 transmits the request received in step 532 to the first computer for processing.

At step 536, the server computer 200 repeats steps 530 through 534 until a customer transaction complete notification is received from the first computer. This notification indicates the customer has paid for the purchase and the purchase transaction is complete. The server computer 200 then closes any records associated with the purchase transaction and closes any communications with the second computer. No further interaction with the second computer is allowed for this purchase transaction.

Although particular reference has been made to an embodiment that includes a customer interaction manager executing on an Internet server computer and examples have been provided illustrating the invention in a restaurant environment, certain other embodiments, variations and modifications are also envisioned within the spirit and scope of the claims. For example, while the majority of the disclosure is made in the context of a presently pictured restaurant system embodiment, it will be recognized that aspects of the present invention may be suitably employed in a wide array of business contexts where improved customer service may be achieved through improved communications between the business and the customer.

The invention is envisioned to function in businesses that normally have customers waiting for a service to be performed. For example, in a tire store it is typical for a customer to wait while store personnel either put on new tires or service old tires on the customer's vehicle. At some time during the purchase transaction, the customer is given a URL to a web site and a unique identifier that identifies the purchase transaction. The customer may then use their mobile smart device 140 to access the web site using the Internet and using the unique identifier receive updates on the status of the work, time to completion, the current costs or a request to meet store personnel to discuss an issue or to request information. The customer may also receive marketing information about additional items for purchase and could have messages posted to social media sites. The customer may also provide feedback to the business about the customer experience.

Examples of other types of businesses that may suitably benefit from the invention include auto repair centers, oil change centers, computer repair stores, restaurants with food take-out area where a customer orders food and waits for it to be prepared to take home and hospital emergency centers where non-critical patients check in and wait, sometimes for hours, before seeing a doctor.

What is claimed is:

1. A method of managing a purchase transaction for a customer at a business where the method is implemented by a first computer, a second computer, and a server computer connected to the Internet, the method comprising the steps of:

starting, by the first computer, a purchase transaction in response to entry of a table identifier that identifies a table that the customer is seated at within the business through an interface of the first computer;

sending, by the first computer, a purchase transaction started notification that includes the table identifier and business identifier for the business to the server computer without any identifying information for the customer;

receiving, by the server computer over the Internet, the purchase transaction started notification from the first computer;

transmitting, by the server computer over the Internet, a unique identifier to the first computer that uniquely identifies the purchase transaction for the table and without any of the customer identifying information;

wirelessly sending, by the first computer, the unique identifier and a Uniform Resource Locator (URL) link for accessing the server computer to the second computer;

wirelessly establishing, by the second computer, communications with the server computer when the customer accesses the URL link and enters the unique identifier as an identifier into a common interface rendered on the second computer when the URL link is activated;

receiving, by the server computer over the Internet and through the common interface, the identifier from the second computer without any of the customer identifying information;

performing, by the server computer, the following sub-steps after determining the received identifier from the second computer matches the unique identifier:

transmitting, by the server computer over the Internet, a first level web page to the second computer through the common interface, and providing through the first level web page first level selectable actions related to the purchase transaction and second level selectable actions related to the purchase transaction;

receiving, by the server computer over the Internet through the common interface, a request to perform a first level selectable action from the second computer based on interactions of the customer with the first level web page through the common interface and while the customer operates the second computer;

transmitting, by the server computer over the Internet, a request to perform the received first level selectable action to the first computer on behalf of the customer and in response to the interactions of the customer through the common interface, wherein the first computer processes the request first level selectable action on the first computer;

repeating, by the server computer, the sub-steps until a customer transaction complete notice is received from the first computer on the server computer;

providing, by the server computer, the common interface for interaction between the second computer and the first computer of the business and providing, by the server computer, the common interface for interaction between the second computer and other first computers of other businesses; and processing the server computer as an intermediary between the first computer and the second computer and processing the server computer with the common interface when the second computer is operated by the customer for a different business having a different first computer.

2. The method of claim 1, further comprising generating the unique identifier identifying the purchase transaction after receiving the purchase transaction started notification from the first computer.

3. The method of claim 1, where the first computer is a server computer executing a point of sale application that performs customer transactions and is located at the business.

4. The method of claim 1, where the business is a restaurant.

5. The method of claim 1, where the second computer is a mobile smart device operated by a customer at the business.

6. The method of claim 1, where the sub-steps further comprises:

receiving, using the Internet, a second level customer login request from the second computer where the request includes second level customer login information;

performing the following sub-sub-steps after determining the received second level customer login information is authentic:

transmitting, using the Internet, a second level web page to the second computer where the second level web page includes first, second and third level selectable actions related to the first customer transaction;

receiving, using the Internet, a request to perform a first or second level selectable action from the second computer;

transmitting, using the Internet, a request to perform the received first or second level selectable action to the first computer; and repeating the sub-steps until a customer transaction complete notice is received from the first computer.

7. The method of claim 6, wherein the second level customer login information includes an email address for the customer.

8. The method of claim 6, wherein the second level customer login information includes login data for a social media web site for the customer.

9. The method of claim 6, where the sub-sub-steps further comprises:

receiving, using the Internet, a third level customer login request from the second computer where the request includes third level customer login information;

performing the following sub-sub-sub-steps after determining the received third level customer login information is authentic:

transmitting, using the Internet, a third level web page to the second computer where the third level web page includes first, second and third level selectable actions related to the first customer transaction;

receiving, using the Internet, a request to perform a first or second or third level selectable action from the second computer;

transmitting, using the Internet, a request to perform the received first or second or third level selectable action to the first computer; and repeating the sub-sub-steps until a customer transaction complete notice is received from the first computer.

10. The method of claim 9, wherein the third level customer login information includes a user name and password for the customer.

11. The method of claim 10, wherein the user name and password are for a social media service for the customer.

12. The method of claim 11, further comprising the sub-sub-step of:

posting a favorable customer comment about the business to the social media service in response to receiving a third level selectable action to post a favorable customer comment to the social media service from the second computer.

13. The method of claim 9, further comprising the steps of:

receiving, using the Internet, a list of items to be purchased as part of the purchase transaction from the first computer; and storing the received list of items purchased, the unique identifier and information that identifies the customer making the purchase transaction.

* * * * *